United States Patent [19]

Shibazaki et al.

[11] 4,441,804
[45] Apr. 10, 1984

[54] ELECTROSTATIC COPYING APPARATUS INCLUDING A SWITCH CHECKING SYSTEM

[75] Inventors: Kenji Shibazaki, Aichi; Masazumi Ito, Toyokawa, both of Japan

[73] Assignee: Minolta Camera Kabushiki Kaisha, Osaka, Japan

[21] Appl. No.: 261,135

[22] Filed: May 4, 1981

[30] Foreign Application Priority Data

May 12, 1980 [JP] Japan .................. 55-63146
Mar. 23, 1981 [JP] Japan .................. 56-42703

[51] Int. Cl.³ .......................... G03G 15/00
[52] U.S. Cl. ................. 355/14 R; 355/8; 371/15
[58] Field of Search ............ 355/3 R, 8, 14 R; 371/15, 16, 20, 25

[56] References Cited

U.S. PATENT DOCUMENTS

| | | |
|---|---|---|
| 3,599,179 | 8/1971 | Arnold ................. 371/25 X |
| 3,633,016 | 1/1972 | Walker et al. .......... 371/25 X |
| 4,009,437 | 2/1977 | Lacher ................. 371/25 X |
| 4,162,396 | 7/1979 | Howard et al. ......... 371/20 |
| 4,183,660 | 1/1980 | Bujese ................. 355/8 X |
| 4,315,685 | 2/1982 | Inuzuka et al. ........ 355/14 R |

*Primary Examiner*—Fred L. Braun
*Attorney, Agent, or Firm*—Wenderoth, Lind & Ponack

[57] ABSTRACT

A copying apparatus includes a switch checking system for examining whether or not a switch to be operated through the operation of the copying apparatus is normally operated. The copying apparatus is provided with a switch to be operated through the operation of a movable member and a controlling apparatus having a program set to output a given controlling signal through judgement of the operating condition of the switch. The controlling apparatus has a controlling mode for switch checking operation and a program for displaying the switching condition when the switch has been operated in the controlling mode and the switch checking is adapted to be performed through the mode switching of the controlling apparatus.

6 Claims, 19 Drawing Figures

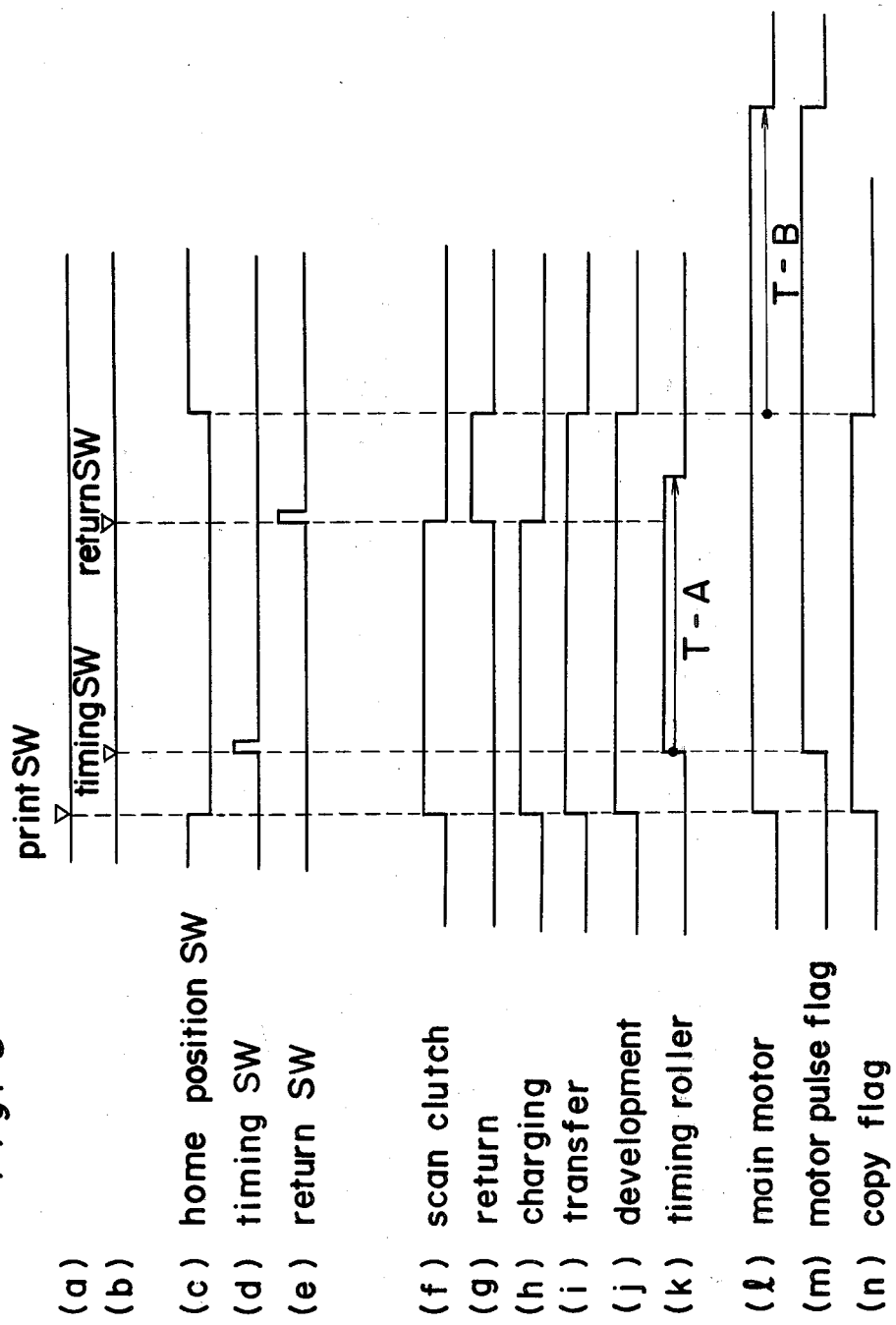

ELECTROSTATIC COPYING APPARATUS INCLUDING A SWITCH CHECKING SYSTEM

BACKGROUND OF THE INVENTION

The present invention relates to a switch checking system and more particularly to a switch checking system for examining whether or not a switch to be operated through the operation of a copying apparatus is normally operated in a copying apparatus whose operation is controlled by such a program controlling apparatus such as a microcomputer.

The control of the operation of a copying apparatus is generally performed by a microswitch which turns on and off through the operation of the copying apparatus, a lead switch or a switch for a photointerrupter or the like. Since this type of switching operation has important influences upon the copying operation, it is necessary to check the performance of the respective switching operations during the assembly of the machines, the repairing and inspecting thereof or the like.

Thus, the switching functions of the individual switches were checked with appliances such as tester (circuit tester), etc., or the machine was actually operated to check whether or not the machine was controlled in accordance with a given program.

However, to check the switching operation of the individual switches with appliances such as tester, etc., not only the wiring, but also wirings or connectors located between the switches and the connecting apparatus were required to be checked to find the failures. Accordingly, the checking operation of the switches required more time. Also, to check the switches after the assembly of the machines, the components with the switches built-in therein were required to be dismantled or the cover of the machine was required to be removed to examine the switch.

Also, to check whether or not the machine is controlled in accordance with a given program through the actual operation of the machine, the checking operation could be performed as to whether or not the individual switches were normally operated through the actual operation of the copying apparatus after the confirmation of the automatic operation of the completed copying apparatus in accordance with a given sequence. However, the checking operation could not be performed as to whether or not the individual switches were normally operated to trace the causes in a case where the given operation could not be performed at a stage of the manufacturing test of the copying apparatus or at a testing stage of the automatic operation.

In recent years, the accumulation of the electronic circuits has been progressed so that microcomputers provided with stored program functions can be inexpensively used in great quantities. Even middle-sized or small-sized copying machines employ microcomputers for sequence controlling operation.

The copying apparatuses to be controlled by this type of program controlling apparatuses were provided, in the program, with routines for operating a copying apparatus for testing operations in accordance with various modes or routines for checking electrical conduction failures or wire disconnections in each component of the machine, but were not provided with a program routine for checking the switching condition.

Accordingly, even in a copying apparatus having a failure detecting function through the use of a program controlling apparatus, the above-described programs concerning the switch checking operation are not removed at all.

SUMMARY OF THE INVENTION

An essential object of the present invention is to provide a switch checking system which can remove the above-described problems of a conventional apparatus accompanied by the checking operation of the switch for the copying apparatus whose operation is controlled by a program controlling apparatus.

Another object of the present invention is to provide a switch checking system, which is adapted to judge the quality of the individual switches by a routine for checking the operating condition of a switch which is operated through the operation of a copying apparatus provided in the program of a program controlling apparatus for controlling the copying apparatus.

A further object of the present invention is to provide a switch checking system which is so superior in practical value that the judgement can easily be made as to the operational condition of the switch through the simple operation such as mode switching operation or the like during the assembly, repairing inspecting, or the like of the copying apparatus.

Another further object of the present invention is to provide a switch checking system wherein the display apparatus can be used to display the operating condition of the switch without providing any special apparatus for displaying the operating condition of the switch.

A still further object of the present invention to provide a switch checking system in which to check each switch, a member for operating the switch can be moved not only to perform the checking operation including the condition of the operating member, but also to check the operating timing of each switch through the motion of the movable member.

According to the present invention, in a copying apparatus which is provided with a switch to be operated through the operation of a movable member and a controlling apparatus having a program set to output a given controlling signal through judgement of the operating condition of the switch, a switch checking system is provided which comprises the controlling apparatus having a controlling mode for switch checking operation and a program for displaying the switching condition when the switch has been operated in the controlling mode and the switch checking is adapted to be performed through the mode switching of said controlling apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8(a) through (n) are time charts showing the operation of each component during the copying operation of a copying machine of FIG. 1;

DESCRIPTION OF THE PREFERRED EMBODIMENTS

The present invention will be concretely described, with reference to accompanying drawings, in an embodiment wherein the present invention has been applied to an electrostatic copying machine (hereinafter referred to as copying machine).

Figure 1:
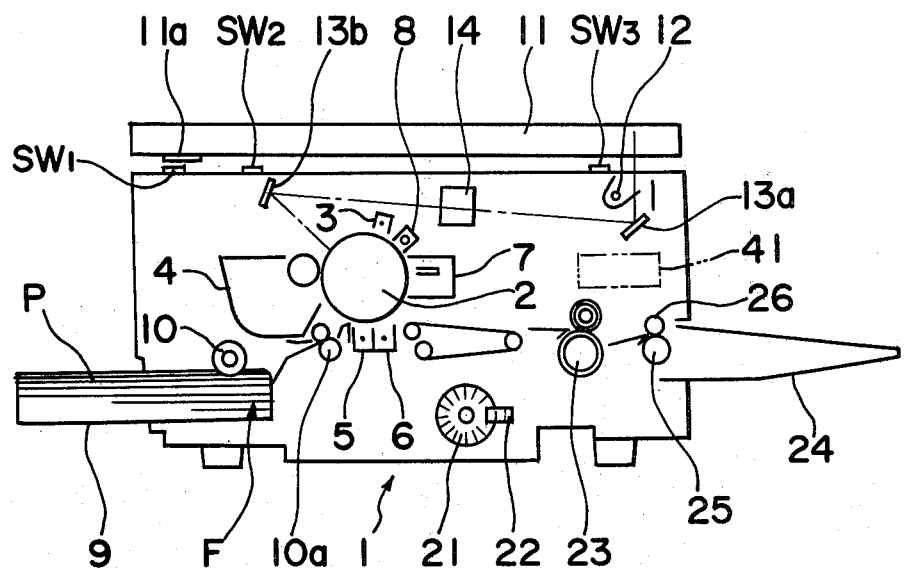
FIG. 1 is a schematic view for illustrating the longitudinal section of a copying machine in one embodiment of the present invention.

Referring to FIG. 1, a copying machine 1 is provided with a controlling apparatus of the present invention. The construction of the copying machine 1 will be described with reference to FIG. 1.

A photosensitive drum 2 which rotates counter-clockwise in FIG. 1 is mounted at the approximately central portion of the copying machine 1. A charging charger 3, a developing apparatus 74, a transfer charger 5, an AC charger 6, a cleaning apparatus, and an erasing lamp 8, etc., which are sequentially disposed around the photosensitive drum 2, sequentially perform the respective processings on the surface of the photosensitive drum 2 through the rotation of the photosensitive drum 2.

An automati,c paper feeding mechanism F is adapted to deliver sheets of copying paper P one by one through the rotation of a paper feeding roller 10 into the location between the photosensitive drum 2 and the transferring charger 5, the AC charger 6, the copying paper retained in layers being brought into a synchronous relationship with the rotation of the photosensitive drum 2 by a timing roller 10a, so that the manuscript images developed are adapted to be transferred on the copying paper P from the photosensitive drum 2.

On the other hand, an original carrier 11 with an original being placed on a transparent plate (not shown) performs a rightward scanning motion in FIG. 1 so that the original image is projected on the photosensitive drum 2 through an optical system, which is composed of a lamp 12, a first mirror 13a, a second mirror 13b, and a lens 14, etc.

A magnet 11a is provided on the under side of the original carrier 11. Through the motion of the above-described original carrier 11, the magnet 11a is adapted to actuate a home position switch $SW_1$, a timing switch $SW_2$ and a return switch $SW_3$, each switch being composed of a lead switch.

A disc 21 for generating pulses rotates in a synchronous relationship with the driving operation of a main motor (not shown). A pulse signal generator 22 generates a series of pulse signals through the use of the rotation of this disc 21.

Also, a fixing heat roll 23 heats and fixes the images of the original placed on the original carrier 11 transferred on the copying paper p from the photosensitive drum 2. A tray 24 receives the copied paper delivered from exhaust rolls 25 and 26.

Figure 2:
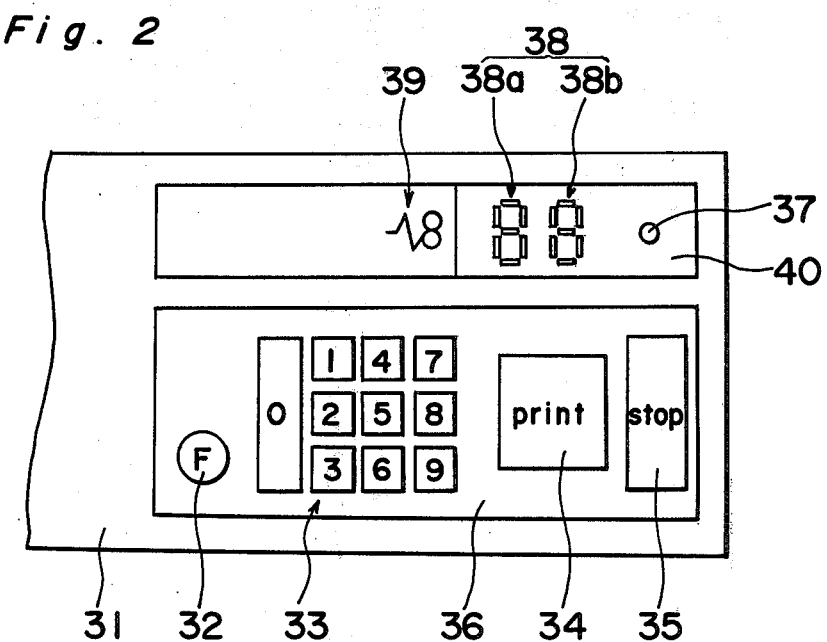
FIG. 2 is a plan view showing one face of a keyboard of FIG. 1.

The copying machine 1 is provided with such an operating panel 31 as described in FIG. 2.

Referring to FIG. 2, a function key 32 is provided to cause the copying machine 1 to perform the test-like operations to be described later. Register numeral keys 33 (ten keys), which are composed of ten keys having "0" through "9", are adapted to set the number of copying sheets of the copying machine 1. A print key 34 is adapted to cause the copying machine 1 to start the copying operation. A stop key 35 is adapted to stop the copying operation of the copying machine 1. The function key 32, ten keys 33, print key 34, and stop key 35 are disposed on the keyboard 36 of the operation panel 31.

A power supply display lamp 37 displays that current is being fed to the copying machine 1. A display portion 38 is composed of seven-segment display elements 38a and 38b each displaying ten-figure and one-figure of the number of the copying sheets determined by the ten keys 33. A jam display portion 39 shows the obstructed paper of the copying machine 1. The power supply display lamp 37, the display portion 38 for displaying the number of sheets and the jam display portion 39 are displayed on the display panel 40 of the operation panel 31.

The display portion 38 is used even for display of test results when the test-like operation of the copying machine 1 has been performed through depression of the function key 32.

Signals to be outputted from the above-described home position switch $SW_1$, timing switch $SW_2$, return switch $SW_3$, pulse signal generator 22, function key 32, ten keys 33, print key 34, stop key 35, etc. are judged and processed by a controlling apparatus 41, as shown in FIG. 3 through FIG. 6, and provided with a microcomputer. The operation of the copying machine 1 is controlled by the controlling signal.

The controlling apparatus 41 will be described hereinafter in detail.

Figure 3:
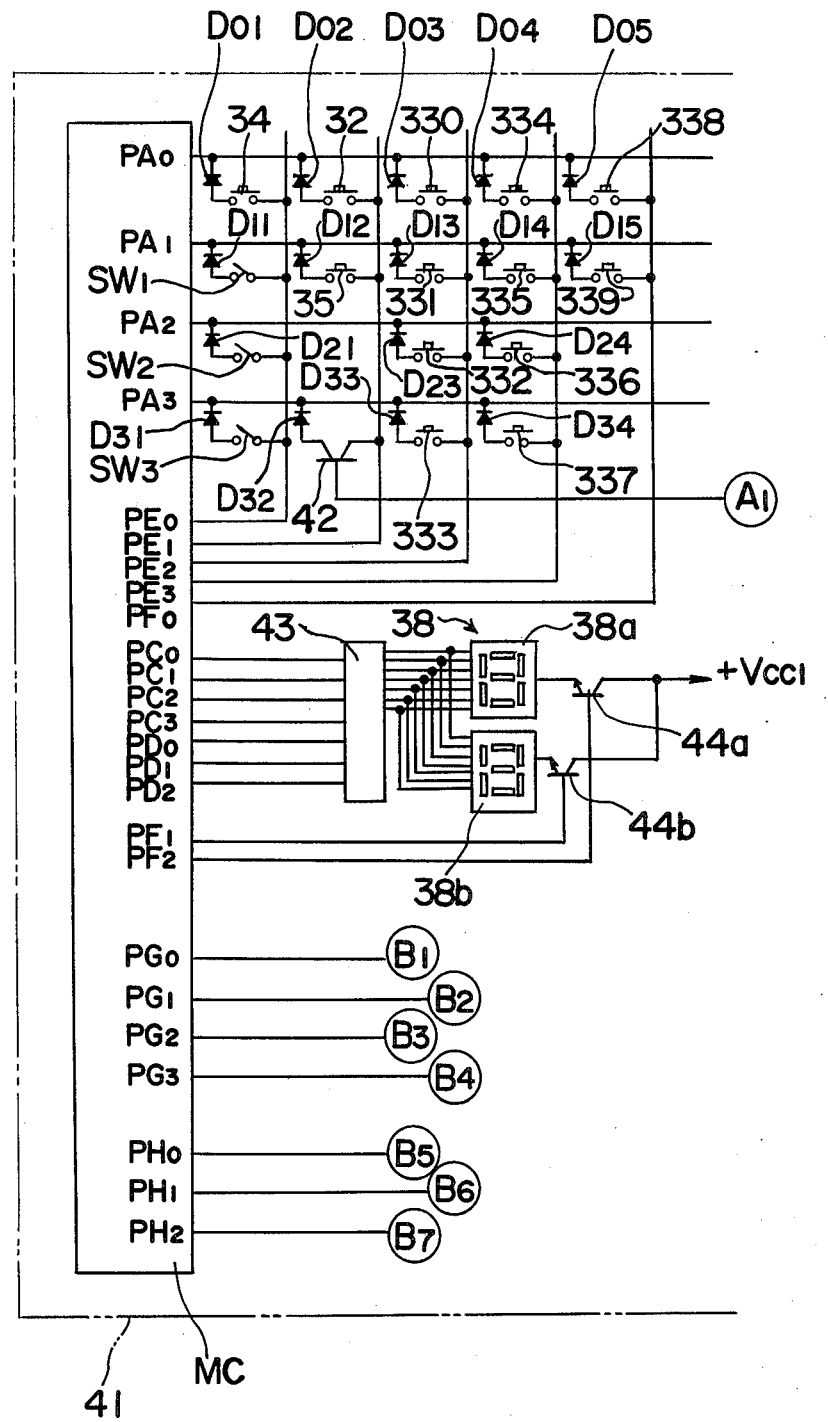
FIG. 3 is a connection diagram for the controlling apparatus of a copying machine of FIG. 1 and each of the switches.

Referring to FIG. 3, a microcomputer MC has a read only memory (ROM), random access memory (RAM), etc. built-in therein. The copying machine 1 executes sequence to be described later in accordance with a program written in the read only memory (ROM).

The microcomputer MC is provided with input ports $PA_0$, $PA_1$, $PA_2$, $PA_3$, outputting ports $PE_0$, $PE_1$, $PE_2$, $PE_3$, $PF_0$, data output terminals for outputting the displaying signals of the display portion 38; $PC_0$, $PC_1$, $PC_2$, $PC_3$, $PD_0$, and $PD_1$, $PD_2$ display unit switching ports are provided for switching the display of the seven-segment display element 38b for displaying the one-figure of the display portion 38 and the display of the seven segment display element 38a for displaying the ten-figure thereof; output ports $PF_1$, $PF_2$ are provided, as well as output ports $PG_0$, $PG_1$, $PG_2$, and $PG_3$, for respectively outputting control signals $B_1$, $B_2$, $B_3$, $B_4$ for controlling each portion of the copying machine 1; output ports $PH_0$, $PH_1$, $PH_2$ are provided for respectively outputting the controlling signals $B_5$, $B_6$, $B_7$. Each cathode of diodes $D_{01}$, $D_{02}$, $D_{03}$, $D_{04}$, $D_{05}$ is connected, respectively, to the input port $PA_0$ of the microcomputer MC. Each cathode of diodes $D_{11}$, $D_{12}$, $D_{13}$, $D_{14}$, $D_{15}$ is connected, respectively, to the input port $PA_1$. Each cathode of diodes $D_{21}$, $D_{23}$, $D_{24}$ is connected, respectively, to the input port $PA_2$. Also, each cathode of diodes $D_{31}$, $D_{32}$, $D_{33}$, $D_{34}$ is connected, respectively, to the input port $PA_3$.

A print switch 34, a home position switch $SW_1$, a timing switch $SW_2$ and a return switch $SW_3$ are respectively connected between the outputting port $PE_0$ of the microcomputer MC and each anode of the diodes $D_{01}$, $D_{11}$, $D_{21}$, $D_{31}$. A function switch 32, a stop switch 35, and an inter-emitter.collector of a transistor 42 are respectively connected between the outputting port $PE_1$ and each anode of the diodes $D_{02}$, $D_{12}$, $D_{32}$.

Figure 4:
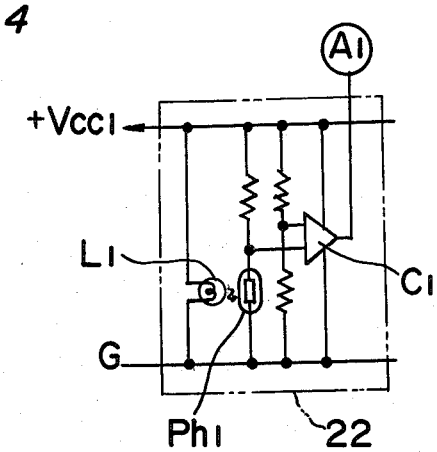
FIG. 4 is the circuit diagram of a pulse signal generator to be employed in the copying machine of FIG. 1.

The transistor 42 performs ON and OFF operations with a pulse signal $A_1$ to be inputted from a pulse signal generator 22. The pulse signal generator 22 is constructed as shown in FIG. 4. A lamp $L_1$ and a light receiving element $P_{h1}$ are disposed with the disc 21 of FIG. 1 spaced equally on the peripheral portion being provided therebetween. The output of a comparator $C_1$ is adapted to become "high" when the light of the lamp $L_1$ has become incident to the light receiving element $P_{h1}$ through the slit of the disc 21 of the lamp $L_1$. The comparator $C_1$ inputs a outputs signal $A_1$ comparable to the revolution speed to the base of the transistor 42 through the rotation of the disc 21.

Returning to FIG. 3, "0" key 330, "1" key 331, "2" key 332, "3" key 333 of the register numeral key 33 are respectively connected between the outputting port $PE_2$ of a microcomputer MC and each anode of the diodes $D_{03}$, $D_{13}$, $D_{23}$, $D_{33}$, and "4" key 334, "5" key 335, "6" key 336, "7" key 337 of the register numeral key 33 are respectively connected between the outputting port $PE_3$ and each anode of the diodes $D_{04}$, $D_{14}$, $D_{24}$, $D_{34}$. Also, "8" key 338, "9" key 339 of the register numeral key 33 are respectively connected between the outputting port $PF_0$ and each anode of the diodes $D_{05}$, $D_{15}$.

Signals to be outputted, respectively, from the data output terminals $PC_0$, $PC_1$, $PC_2$, $PC_3$, $PD_0$, $PD_1$, $PD_2$ of the microcomputer MC are inputted to a driver circuit 43 for respectively driving the seven-segment display elements 38a, 38b of the display portion 38.

Transistors 44a and 44b are connected between the seven-segment display elements 38a, 38b and a power supply (+Vcc1). Display switching signals to be outputted, respectively, from the display switching ports $PF_2$ and $PF_1$ of the microcomputer MC are inputted, respectively, to each base of these transistors 44a and 44b.

Figure 5:
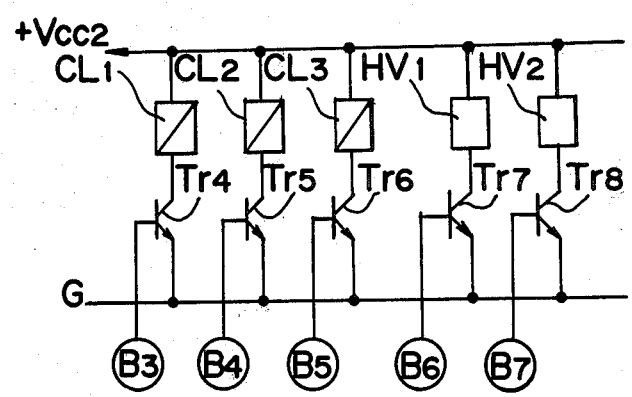
FIG. 5 is a circuit diagram of a controlling apparatus for a copying machine to be controlled by a microcomputer of FIG. 3.
Figure 6:
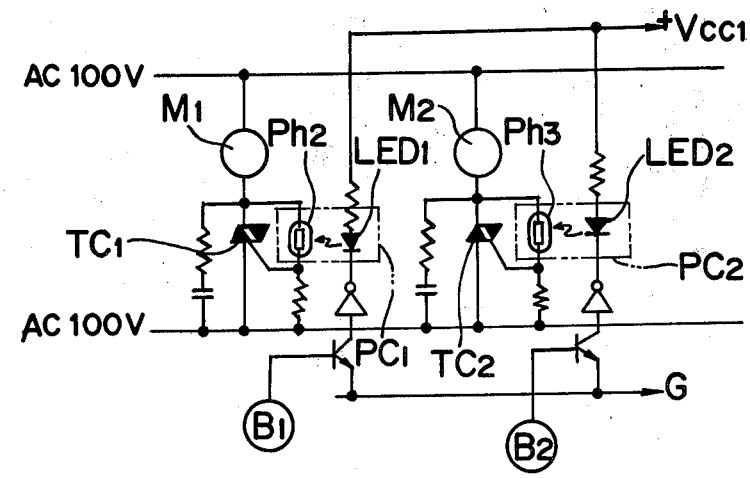
FIG. 6 is the circuit diagram of a motor driving circuit to be controlled by the microcomputer of FIG. 3.

The output port $PG_0$ through $PG_3$ and the output ports $PH_0$ through $PH_2$ of the microcomputer MC are controlling output terminals to be connected, respectively, to the circuits shown respectively in FIG. 5 and FIG. 6.

When the outputs $B_1$, $B_2$ of the output ports $PG_0$, $PG_1$ become "LOW" respectively, the light emitting diode $LED_1$ of the photocoupler $PC_1$ of FIG. 6 and the light emitting diode $LED_2$ of the photocoupler $PC_2$ are respectively lit to render the light receiving elements $P_{h2}$ and $P_{h3}$ of the photocoupler $PC_1$ and $PC_2$ conductive to trigger triacs $TC_1$ and $TC_2$ so as to thereby turn on a main motor $M_1$ and a development motor $M_2$.

When the outputs $B_3$ and $B_4$ of output ports $PG_2$, $PG_3$ and the outputs $B_5$ through $B_7$ of the output ports $PH_0$ through $PH_2$ of the microcomputer MC become "LOW", transistor $Tr_4$ through $Tr_8$ of FIG. 5 become respectively on so that a scan clutch $CL_1$ for scanning and moving the original carrier 11, a return clutch $CL_2$ for returning and moving the original carrier 11, a clutch $CL_3$ for driving a timing roller 1, a high-voltage power supply $HV_1$ of a charging charger 5, a high-voltage power supply $HV_2$ of a transferring charger 5 are respectively controlled so as to be turned on.

The paper feeding roller 10, the erasing lamp 8, etc. are controlled through the same construction as described hereinabove.

As described hereinabove, the microcomputer MC is associated with various switches and each mechanism of a copying machine 1. The operation of each mechanism of the copying machine and the checking operation of each switch of the copying machine 1 are controlled by a program written in the read only memory built-in the microcomputer MC. One example of the concrete processing procedure will be described hereinafter.

(1) Normal Copying Operation

Before the description of the checking operation of the switch, the normal copying operation of the copying machine 1 will be described hereinafter with reference to the time chart of FIG. 8 in accordance with a flowchart composed of blocks 1100 through 2300 shown respectively in FIG. 7(a) through (d).

(Processing in block 1100)

Figure 7A:
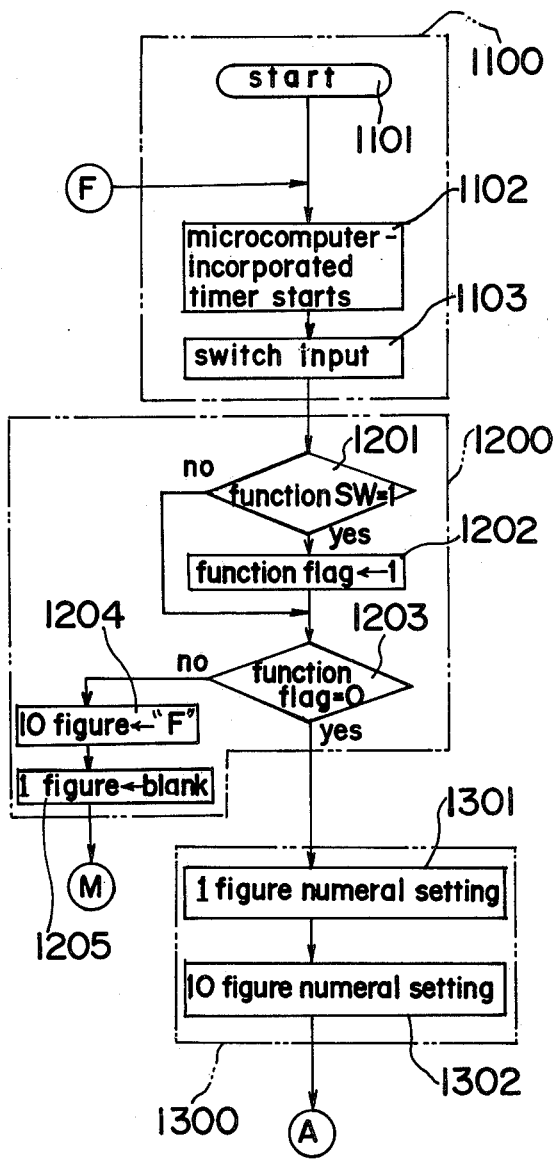
FIG. 7(a) through (d) are flowcharts showing the processing procedure during the copying operation of a copying machine by the microcomputer of FIG. 3.
Figure 7B:
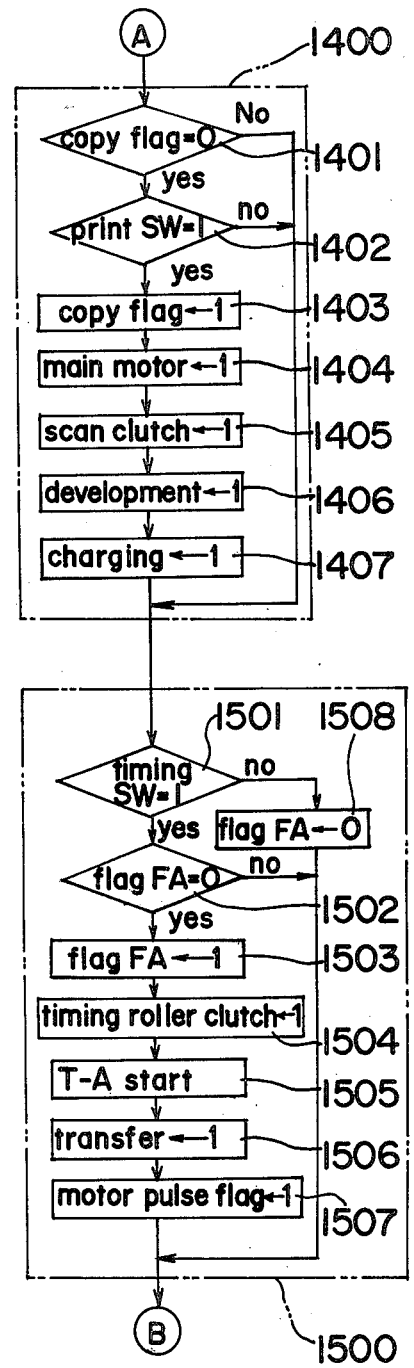
Figure 7C:
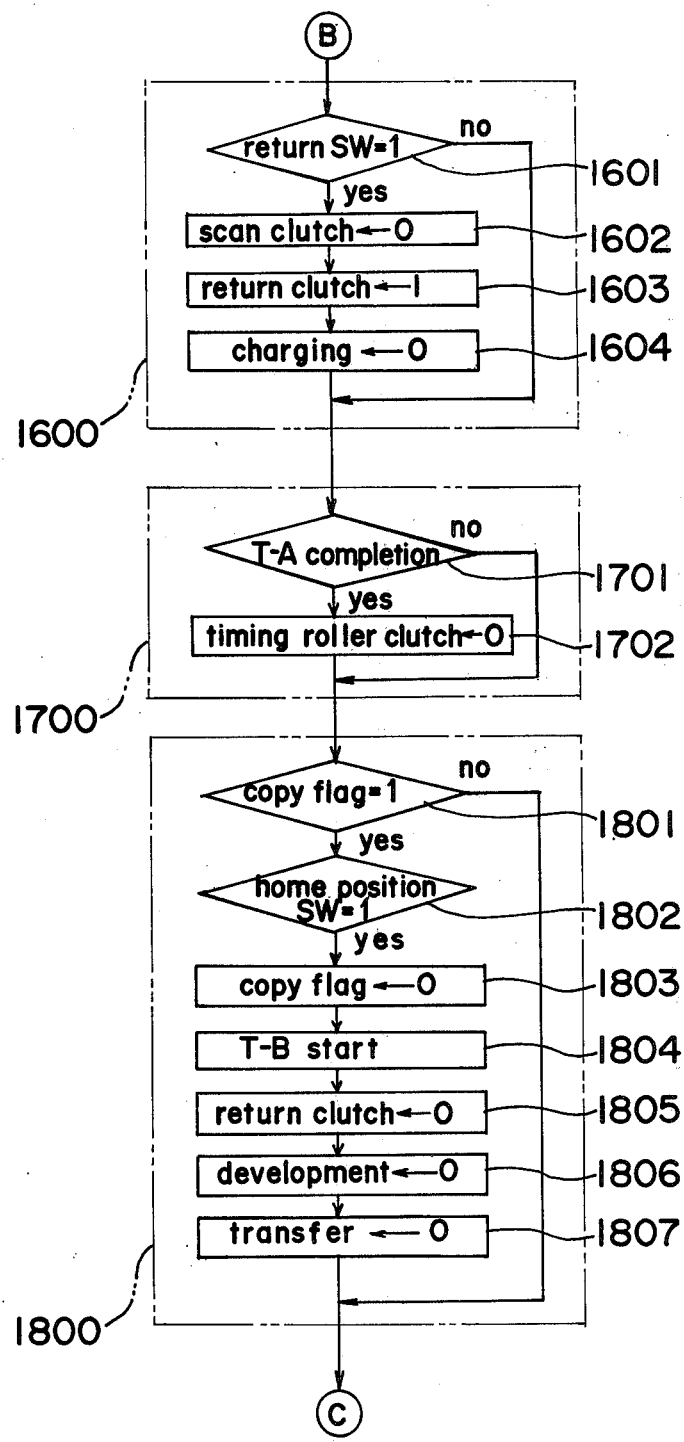

In the block 1100 of FIG. 7(a), the microcomputer MC starts a built-in timer (not shown) at an initial step 1102 from the start 1101 of the program processing.

The built-in timer is set slightly longer than time required to execute one routine of the operation program of the copying machine 1. More detailed contents will be disclosed in the U.S. Patent No. 4,280,763.

At the step 1103, the microcomputer MC scans the inputting condition, from each switch of the copying machine of a function key 32, a register numeral key 33, a home position switch $SW_1$, etc.

(Processing in block 1200)

At the step 1201 of a block 1200, the microcomputer MC judges whether the function key 32 is turned on or off (hereinafter "1" represents that the switch is turned on and "0" represents that the switch is turned off) by the processing of the step 1103. When the function key 32 is "1", the function flag is rendered "1" at a step 1202. When the function key 32 is "0", a jump is made to a step 1203.

At the step 1203, judgement is made as to whether or not the function flag is "0". When the function flag is not "0", the copying machine 1 is put into function mode where various test-like operations are performed. At a step 1204, a letter "F" showing the function mode is displayed on the seven-segment display element 38a of ten figures of the display portion 38 to render blank the display of the seven-segment display element 38b of one figure of the display portion 38. Thereafter, a jump is made to the routine of a function mode where flowcharts are shown, respectively, in FIG. 9(a) through (c).

On the other hand, when the function flag is "0", a jump is made to the routine of the normal copying operation (copying mode) of the block 1300 or subsequent.

(Processing in block 1300)

At the steps 1301 and 1302 of the block 1300, the normal numeral setting of seven-segment display element 38b of one figure of the display portion 38 and the seven-segment display element 38a of ten figure thereof are respectively effected due to the result of the scanning operation performed at the step 1103 of the block 1100. Thereafter, a routine represented by a block 1400 is executed.

(Processing in block 1400)

At a step 1401 of the block 1400, judgement is made as to whether or not the copying flag Fc is "1". When the copying flag Fc is "1", the copying machine 1 is in copying operation, and the copying flag Fc is "0", the copying machine 1 is not in copying operation, i.e., the following copying operation can be effected.

At a step 1402, judgement is made as to whether or not the print switch 34 is "1". The microcomputer MC detects that the print switch 34 is "1" to cause the copying flag Fc to become "1" (see FIG. 8(n)) at a step 1403. A main motor $M_1$, a scan clutch $CL_1$, a developing motor $M_2$ and a charging charger 3 are turned on (see FIG. 8(l), (f), (j), (h)) from the steps 1404 through 1407.

(Processing at block 1500)

At a block 1500, the paper feeding operation is started through the processing of the block 1400, and the original carrier 11 starts its scanning motion to thereby effect the processing operation in a case where the magnet 11a of the original carrier 11 has turned on the timing switch $SW_2$.

At the step 1501 of the block 1500, the condition of the timing switch $SW_2$ is judged. In the case of YES, a judgement is performed as to whether or not the flag FA described hereinafter is "0" at a step 1502. In the case of NO, the flag, FA is rendered "0[ at a step 1508.

With respect to the flag FA, as shown at a step 1503, a "1" is set by the routine when the timing switch $SW_2$ is judged to be on. At a step 1502, judgement is made to confirm the rising of the signal of the timing switch $SW_2$.

As shown in FIG. 8(b) and (d), a timing switch $SW_2$ is turned on and the rising of the output is judged so that the flag FA is set to "1" at the step 1503. The clutch $CL_3$ of the timing roller 10a is turned on (see FIG. 8(k)) at the step 1504. At a step 1505, a timer T-A for turning off a timing roller 10a is set (see FIG. 8(k)) at a step 1505. A transfer charger 5 is turned on (see FIG. 8(i)) at a step 1506. A motor pulse flag FP to be described later is set to a "1" at a step 1507 (see FIG. 8(m)).

After the completion of the above-described processing, the microcomputer MC executes the processing of a block 1600.

(Processing in block 1600)

At the block 1600, the processing operation is performed in a case where the return switch $SW_3$ has been "1" by the magnet 11a of the original carrier 11.

When the judgement is made that a return switch $SW_3$ has become "1" at a step 1601 of the block 1600, a scan clutch $CL_1$ is turned off at a step 1602, a return clutch $CL_2$ is turned on at a step 1603, and a charging charger 3 is turned off see FIG. 8(e), (g), (h)) at a step 1604 so as to thereby execute the next block 1700.

(Processing in block 1700)

In a block 1700, the processing at the completion of a timer T-A is performed. At a step 1701, the completion of the timer T-A is judged and then the clutch $CL_4$ of the timing roller 10a is turned off (see FIG. 8(k)) at a step 1702 to execute the next block 1800.

(Processing in block 1800)

In a block 1800, the original carrier 11 returns to perform the processing when a magnet 11a has turned on a home position switch $SW_1$.

The step 1801 of the block 1800 judges whether or not the copying machine 1 is in a copying operation. When the copying flag FC is "1", the condition of the home position switch $SW_1$ is judged at a step 1802.

When the home position switch $SW_1$ is kept on by a magnet 11a, the copy flag is set to become "0" at a step 1803 to set an automatic shutting timer T-B (see FIG. 8(n), (l)) at a step 1804. At steps 1805 through 1807, the return clutch $CL_2$, the developing motor $M_2$ and the transferring charger 5 are turned off (FIG. 8(g), (j), (i)) to move to the execution of the next block 1900.

(Processing in block 1900)

In a block 1900, the processing at the completion of automatic shut timer T-B is performed. Once the completion of the timer T-B is judged at a step 1901, a main motor $M_1$ is turned off at a step 1902 and a motor pulse flag FP becomes "0" (FIG. 8(l), (m)) at a step 1903 so as to move the execution of the next block 2000.

(Processing in block 2000)

At a step 2001 of the block 2000, the completion of the built-in timer of the microcomputer MC is judged.

As described hereinabove, the built-in timer is set slightly longer than time required to execute one routine of the copying operation of a copying machine 1. A waiting time is provided without fail from the execution of all the processing to the time-up of the built-in timer.

The waiting time absorbs the changes in the processing time of one routine of the copying operation of the copying machine 1 through the condition of the copying machine 1 thereby to provide unification to a constant time.

(Processing in block 2100)

When the judgement is made that the built-in timer of the microcomputer MC has become time-up at the step 2001 of a block 2000, the display of seven-segment display element 38b, for one-figure display use, of the display portion 38 of the copying machine 1 is performed at a block 2100.

Namely, at the step 2101 of the block 2100, the microcomputer MC starts the incorporated timer for one figure display use to make a display, by the seven-segment display element 38b, at a step 2101. When the time-up of the incorporated timer is judged at a step 2103, the display of one-figure seven-segment display element 38b of the display portion 38 is over. The display of the seven-segment display element 38a of ten-figure display of the display portion 38 of the copying machine 1 is made at the next block 2200.

(Processing in block 2200)

At the step 2201 of the block 2200, the microcomputer MC starts the incorporated timer for ten-figure display use. At the step 2202, the display is made by the seven-segment display element 38a at a step 2202. When the time-up of the inner timer is judged at a step 2203, the display of the ten-figure seven-segment display element 38a of the display portion 38 is completed at a step 2204. The display portion 38 makes a time-division display of one-figure and ten-figure displays through the processing of the blocks 2100 and 2200.

(Processing in block 2300)

In a block 2300, a processing operation is performed with a synchronous relationship between the program processing time of the microcomputer MC and the driving speed of the copying machine 1.

The step 2301 of the block 2300 judges whether or not the motor pulse flag FP is "1".

As described hereinabove, the motor pulse flag FP is a flag where "1" is provided by the "1" of the timing switch $SW_2$. The controlling signal of the subsequent paper feeding operation and the microcomputer MC comes into synchronous relation with the pulse signal from the motor pulse generator 22.

At a step 2302, the detection of a motor pulse is judged after the completion of the built-in timer of the microcomputer MC. The microcomputer MC waits for the inputting operation of the motor pulse to repeat the above-described processing routine.

(2) Operation Of Function Mode

Then, the operation during the function mode as the test operation of the copying machine 1 will be described, with reference to the time chart of FIG. 10, in accordance with a flowchart, which is composed of blocks 3000 through 3800, respectively and which is, shown in FIG. 9(a) through (c).

When the function key 32 of the copying machine 1 shown in FIG. 2 is on at "1", the microcomputer MC judges that the function flag is not "0" at 1203 of the block 1200 of FIG. 7(a). As shown in FIG. 10(a), the function flag is set to "1" at a step 1202.

When it is judged that the function flag is not "0" at the step 1203 of FIG. 7(a), the microcomputer MC displays a letter "F" showing the function mode in the ten-figure seven-segment display element 38a of the display portion 38 at a step 1204. Also, at a step 1205, the seven-segment display element 38b becomes blank so that "F⊔" is displayed on the display portion 38 as shown in FIG. 10(e). The symbol ⊔ corresponds to a blank. Actually nothing is displayed. Thereafter, the processing of the block 3000 of FIG. 9(a) is performed.

(Processing in blocks 3000 and 3100)

Figure 9A:
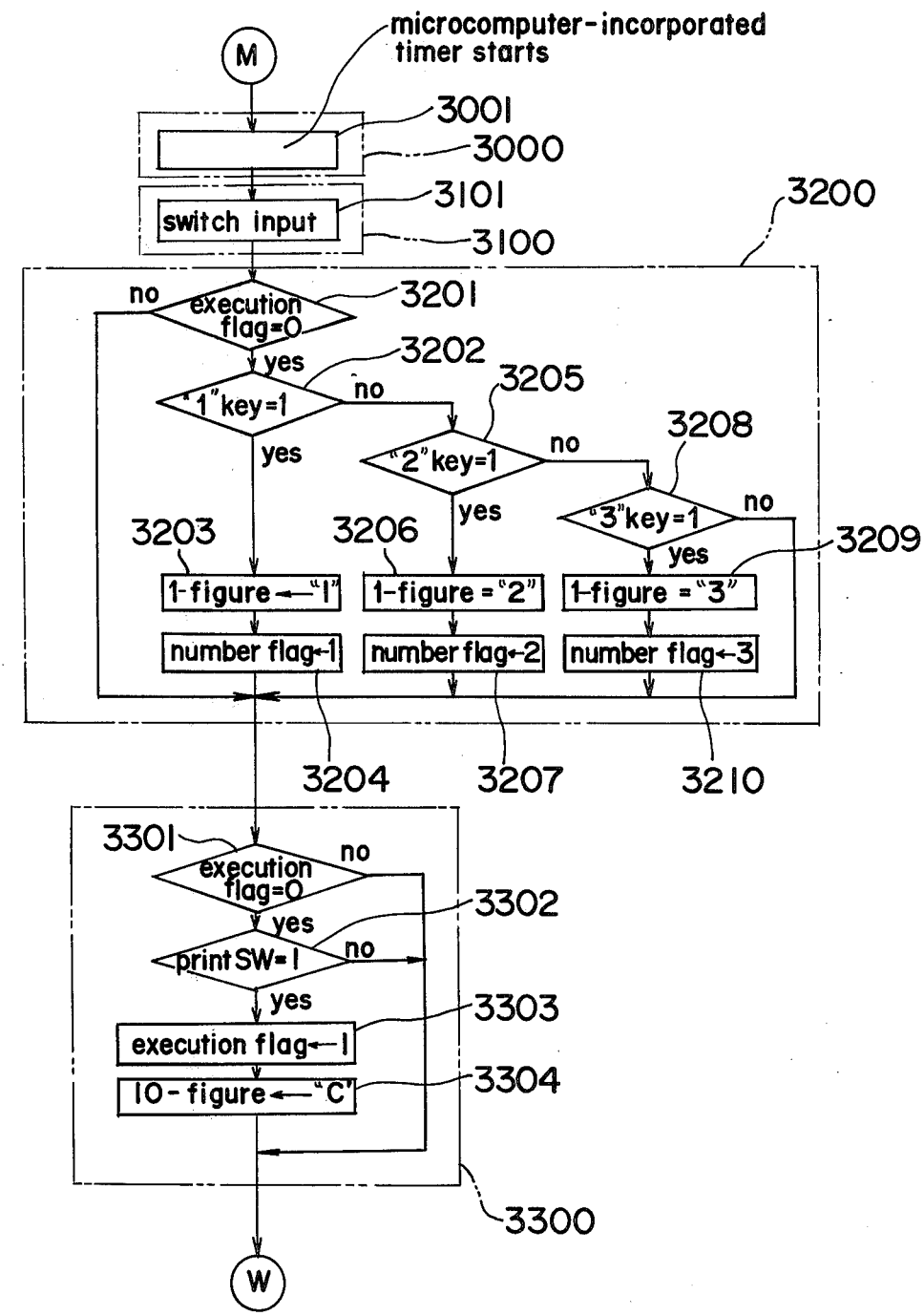
FIG. 9(a) through (c) are flowcharts showing the processing procedure in the checking mode of the switch of a copying machine to be controlled by a microcomputer of FIG. 3.
Figure 9B:
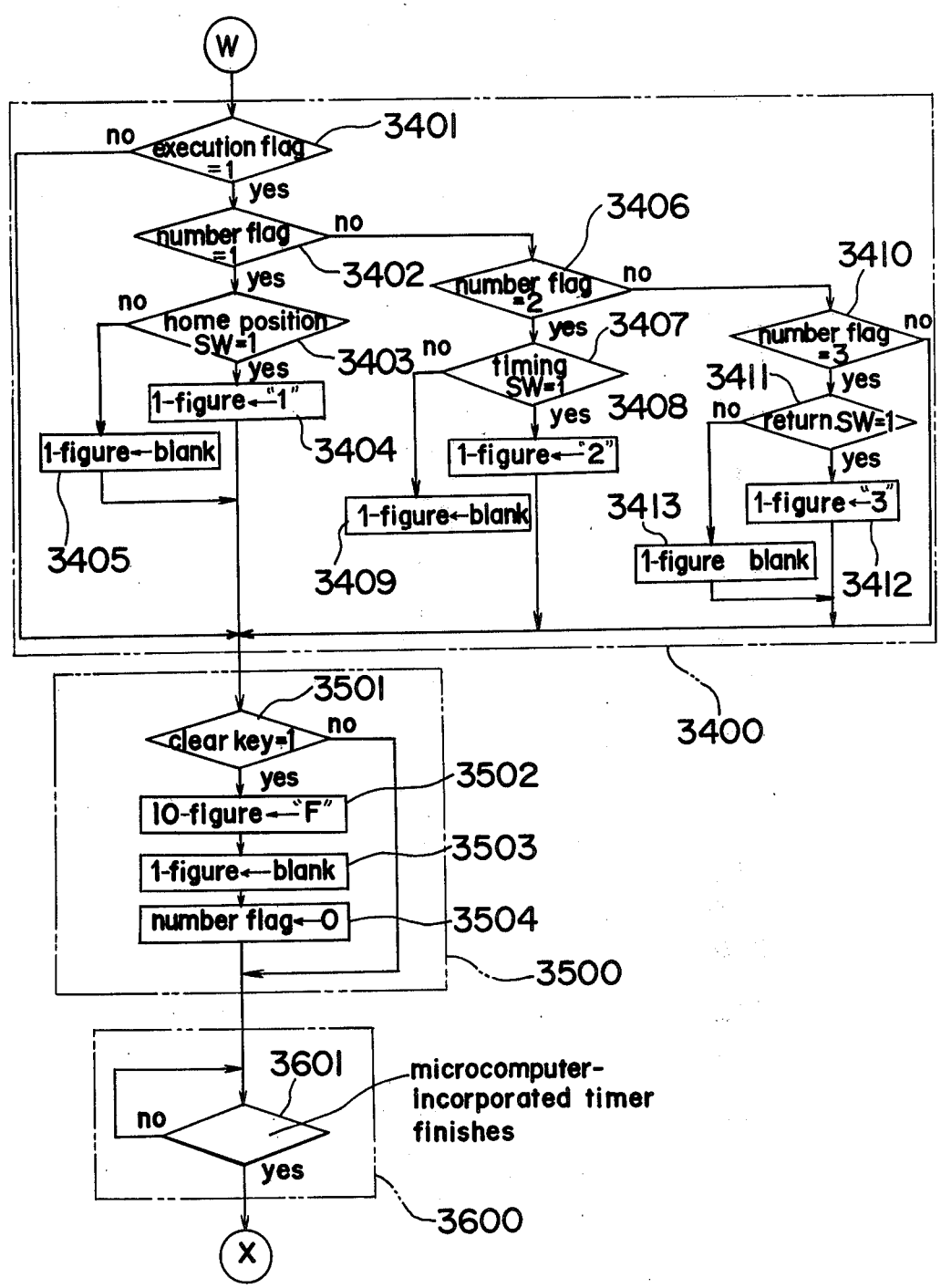
Figure 10:
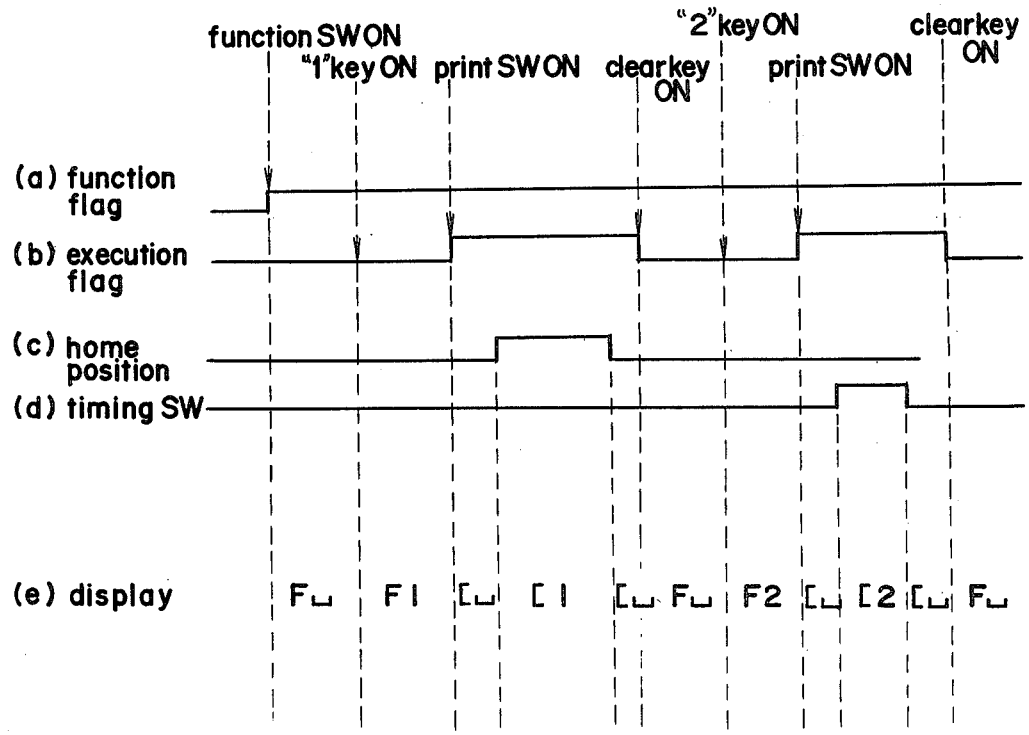
FIG. 10(a) through (e) are time charts showing the relationship between each switch and the display in the checking mode of the switch of the copying machine of FIG. 1.

In the block 3000 of FIG. 9(a), the microcomputer MC starts a built-in timer(which is different from the built-in timer of the step 1102 of FIG. 7(a)), which renders uniform the length of one routine of the functional operation for performing various kinds of test-like operations of the copying machine 1.

At the step 3101 of the block 3100, the microcomputer MC scans the register numeral key 33, print switch 34, etc. and then to process the block 3200.

(Processing in block 3200)

A block 3200 is a routine to specify, with a register key 33, the test location of a copying machine 1. In the present embodiment, a home position switch $SW_1$, a timing switch $SW_2$ and a return switch $SW_3$ are specified, respectively, by the "1" key 331 of the register numeral key 33, the "2" key 332 and the "3" key 333.

At the step 3201 of the block 3200, the microcomputer MC judges whether or not the execution flag of the routine of the block 3200 is "0".

When the execution flag is "0", the test location of the copying machine 1 can be specified.

At this time, when "1" key 331 of the register numeral key 33 is "1", "1" key 331 is judged to be "1" at a step 3202. A numeral "1" is displayed in the seven-segment display element 38b of the display portion 38 at a step 3203. As shown in FIG. 10(e), the display of "F1" is caused to be displayed on the display portion 38 and thereafter "1" is stored in the number flag at a step 3204.

When the "2" key 332 of the register numeral key 33 is "1", the "2" key 332 is judged to become "1" at a step 3202. At a step 3206, a numeral "2" is displayed by the seven-segment display element 38b of the display portion 38. The display of the "F2" is made as shown in FIG. 10(e), on the display portion 38 and thereafter the "2" is stored in the number flag at a step 3207.

Also, when the "3" key 333 of the register numeral key 33 is "1", "3" key 333 is judged to be "1" at a step 3208. A numeral "3" is displayed on the seven-segment display element 38b of the display portion 38 at a step 3209 to display the "F3" on the display portion 38, as shown in FIG. 10(e), and thereafter "3" is stored in the number flag at a step 3210.

When neither one of the register numeral key 33 is "1", at a block 3200, the microcomputer MC jumps to the routine execution of the next block 3300.

At the routine of the block 3200, the "1" key 331 of the register numeral key 33 is depressed to store the "1" in the number flag, and the "2" key 332 is depressed to store the "2" in the number flag. Also, the "3" key 333 is depressed to store the "3" in the number flag. Thereafter, the routine of the next block 3300 is executed.

(Processing in block 3300)

A block 3300 is a routine for setting, in the microcomputer MC, the execution of the checking mode, wherein the home position $SW_1$, the timing switch $SW_2$ and the return switch $SW_3$ are respectively checked, in the microcomputer MC.

At a step 3301 of the block 3300, judgement is made whether or not the execution flag is "0" in the routine of the block 3300.

In the case that the execution flag is "0" during the execution of the checking mode at the step 3301, when a print switch 34 which is used as a key for starting the checking mode is depressed, at the step 3302, the print switch 34 is judged as "1", and as shown in FIG. 10(b), the execution flag becomes "1" at a step 3303. At a step 3304, a reference character "[" is displayed, by the use of four segments from among the seven-segments, on the ten-figure seven-segment display element 38a of the display portion 38.

(Processing in block 3400)

A block 3400 is a routine for checking switches stored in the number flag at a block 3200.

At a step 3401, the microcomputer MC judges whether or not the execution flag of the block 3400 is "1". When the execution flag is "1", a step 3402 is executed. When the execution flag is "0", a jump is made to a block 3500.

When, for example, "1" is kept stored in the number flag, judgement is made that the number flag is "1" at the step 3402 and the following step 3403 is executed.

At the step 3403, judgement is made that the home position switch $SW_1$ is "1" to display a numeral "1" on the one-figure seven-segment display element 38b of the display portion 38 at a step 3404. When the judgement is made that the home position switch $SW_1$ is not "1", the seven-segment display element 38b is rendered blank at a step 3405.

When the original carrier 11 of the copying machine 1 has been manually moved, the home position switch $SW_1$ becomes "1" (is turned on) to render the display of the display portion 38 become "[1". Also, when the home position switch $SW_1$ becomes "0" (is turned off), the display of the display portion 38 becomes "[⊔" (see FIGS. 10(b), (c), (e)).

Accordingly, the display portion 38 displays whether the home position switch $SW_1$ is "1" or "0" (or turned on or off). The original carrier 11 can be moved as described hereinabove to check, through the action of the home position switch $SW_1$, whether or not the home position switch $SW_1$ is switched at a predetermined position of the original carrier 11.

When the "2" is stored in the number flag, the judgement is made whether or not the number flag is "2" at the step 3406 of the block 3400. When the judgement is made that the timing switch $SW_2$ is "1" at the next step 3407, a numeral "2" is displayed on the one-figure seven-segment display element 38b of the display portion 38 at a step 3408. The "⊔" showing the blank is displayed (see FIGS. 10(b), (d), (e)) at the seven-segment display element 38b of the display portion 38 when the judgement is made that the timing switch $SW_2$ is not "1".

Even in the timing switch $SW_2$, the checking operation of the timing switch $SW_2$ can be performed in completely the same manner as the above-described home position switch $SW_1$.

When the number flag is stored in "3", judgement is made that the number flag is "3" at a step 3410 of the block 3400. At the next step 3411, the judgement is made that the return switch $SW_3$ is "1" to display the numeral "3" on the one-figure seven-segment display element 38b of the display portion 38 at a step 3412. When the judgement is made that the return switch $SW_3$ is not "1", the seven-segment display element 38b comes to display the "⊔" showing the blank at a step 3413.

Accordingly, even in the return switch $SW_3$, the checking operation of the return switch $SW_3$ can be performed in completely the same manner as the home position switch $SW_1$ and the timing switch $SW_2$.

From the above description, the relationship between the display of the display portion 38 and the operation contents of the switches such as home position switch $SW_1$, timing switch $SW_2$ return switch $SW_3$, etc. can be collected into the following Table 1.

TABLE 1

| Operation Contents | | Display | Description |
|---|---|---|---|
| function key | on | F⊔ | |
| "1" key | on | F1 | |
| print switch (home position switch | on off) | [⊔ | inferior short-circuit in the case of [1 |
| home position switch | on | [1 | inferior contact in the case of [⊔ |
| home position switch | off | [⊔ | position adjustable by display |
| clear key | on | F⊔ | |
| "2" key | on | F2 | |
| Print switch (timing switch | on off) | [⊔ | inferior short-circuit in the case of [2 |
| timing switch | on | [2 | inferior contact in the case of [⊔ |
| timing switch | off | [⊔ | position adjustable by display |
| clear key | on | F⊔ | |
| "3" key | on | F3 | |
| print switch (return switch | on off) | [⊔ | inferior short-circuit in the case of [3 |
| return switch | on | [3 | inferior contact in the case of [⊔ |
| return switch | off | [⊔ | position adjustable by display |
| clear key | on | F⊔ | |

(However, ⊔ represents blank.)

However, in the Table 1, the clear key is a key for clearing the number flag. In the present embodiment, the stop key 35 of the copying machine 1 is used. The stop key 35 is depressed to process the following block 3500.

(Processing in block 3500)

The checking operation of the home position switch $SW_1$ is completed through the processing from the step 3402 to the step 3405 of the block 3400. Thereafter, the stop key 35 is depressed and the judgement is made that the clear key is "1" at the step 3501 of the block 3500. "F" is displayed on the ten-figure seven-segment display element 38a of the display portion 38 at a step 3502. "⊔" is displayed (see FIGS. 10(b), (e)) on the one-figure seven-segment display element 38b of the display portion 38 at a step 3503. Thereafter, the number flag is cleared at a step 3504 to move to the execution of the next block 3600 or to subsequennt blocks.

(Processing in block of block 3600 or subsequent)

At a step 3601 of the block 3600, the completion of the time period of a built-in timer, which renders uniform the length of one routine of the functional operation of the microcomputer $MC_1$ occurs.

Figure 9C:
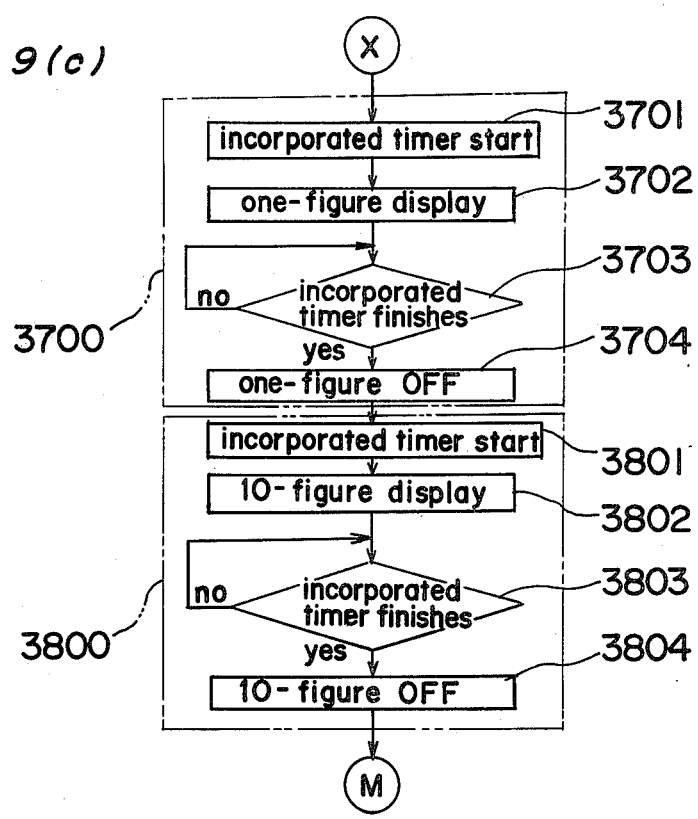

Once the execution of the block 3600 is completed, the routines of the blocks 3700 and 3800 of FIG. 9(c) are executed.

Figure 7D:
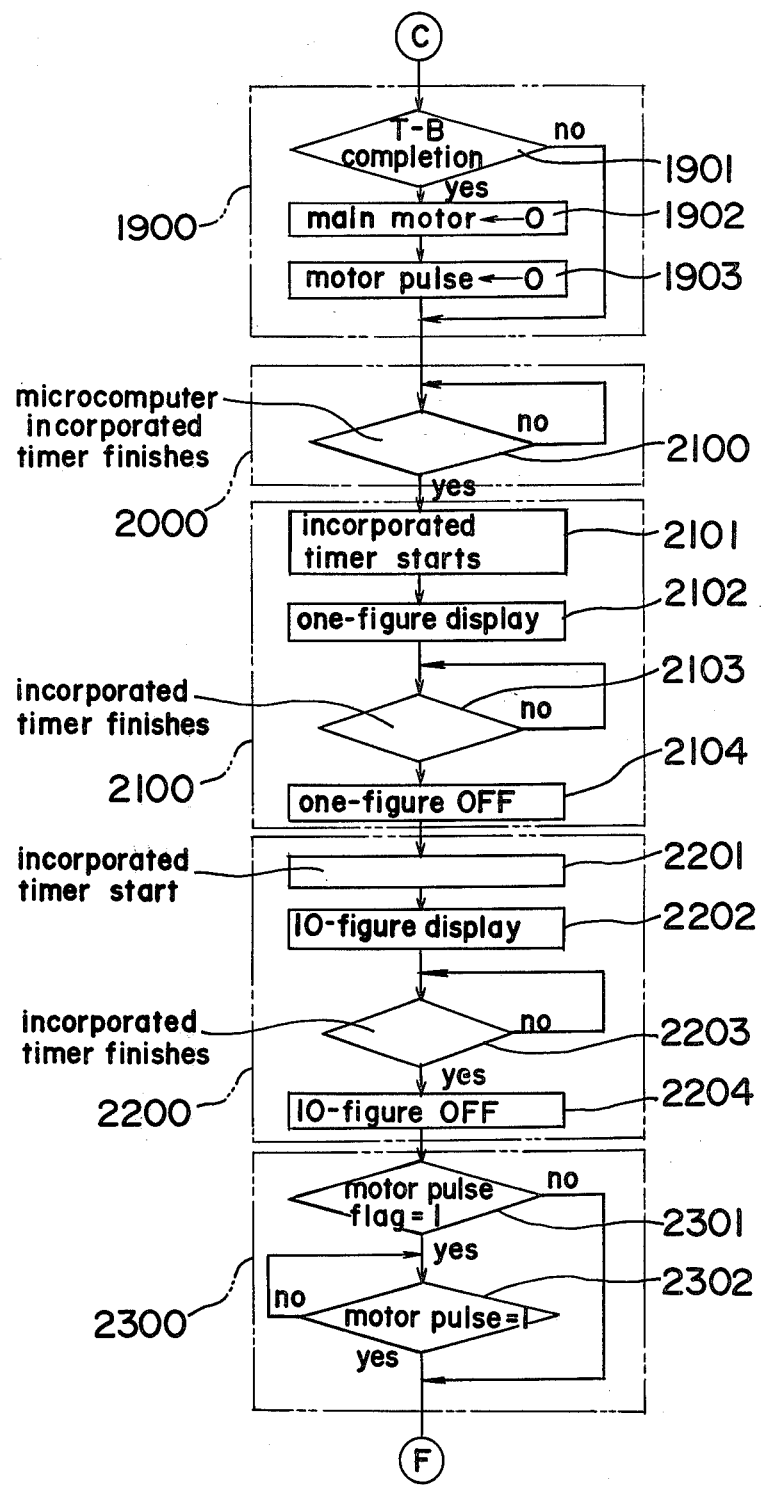

The routine from the step 3701 of the block 3700 to the block 3704 is the same as the routine from the step 2201 of the block 2200 of FIG. 7(d) to the step 2204. The routine from the step 3801 of the block 3800 to the step 3804 is the same as the routines of the steps 2301, 2302 of the block 2300 of FIG. 7(d). The display portion 38 performs the time division display of one-figure and ten-figure due to the processing of these blocks 3700 and 3800.

The execution of one routine of the function mode is completed through the completion of the step 3804 of the block 3800. The microcomputer MC repeats the processing routine of the above function mode, by the start of a built-in timer, at the block 3001.

In the manner described hereinabove, the home position switch $SW_1$, the timing switch $SW_2$ and the return switch $SW_3$ are checked, and the mounting position is adjusted by the display of the display portion 38 when the original carrier 11 has been manually moved.

Another embodiment of the present invention will be described with reference to FIGS. 11(a), (b), (c) and FIG. 12.

Even in the present embodiment, the microcomputer MC executes each routine of the block 1100 through 2300 shown in FIG. 7(a) through (d) at a copying mode.

Figure 11A:
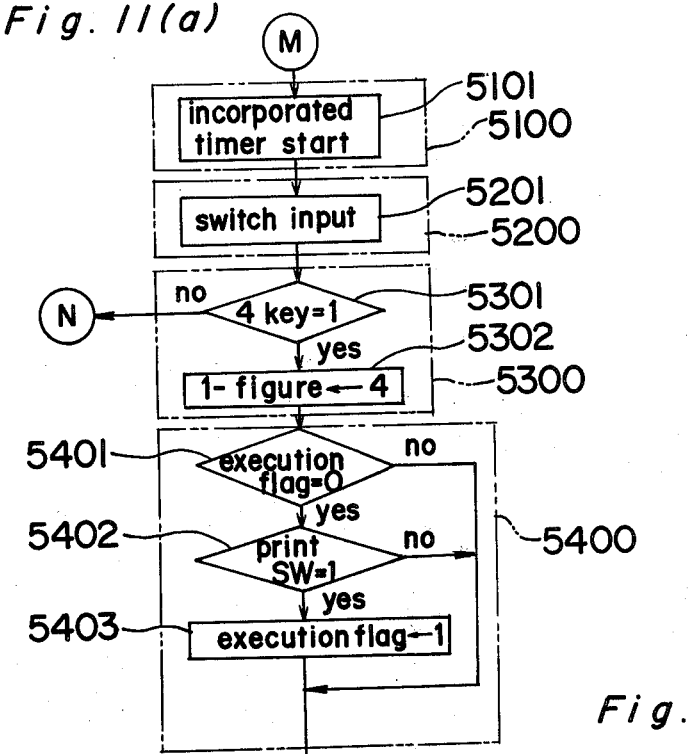
FIG. 11(a) through (c) are flow charts each showing the processing procedure in the checking mode of the switch of the copying machine by a microcomputer in another embodiment of the present invention.
Figure 11C:
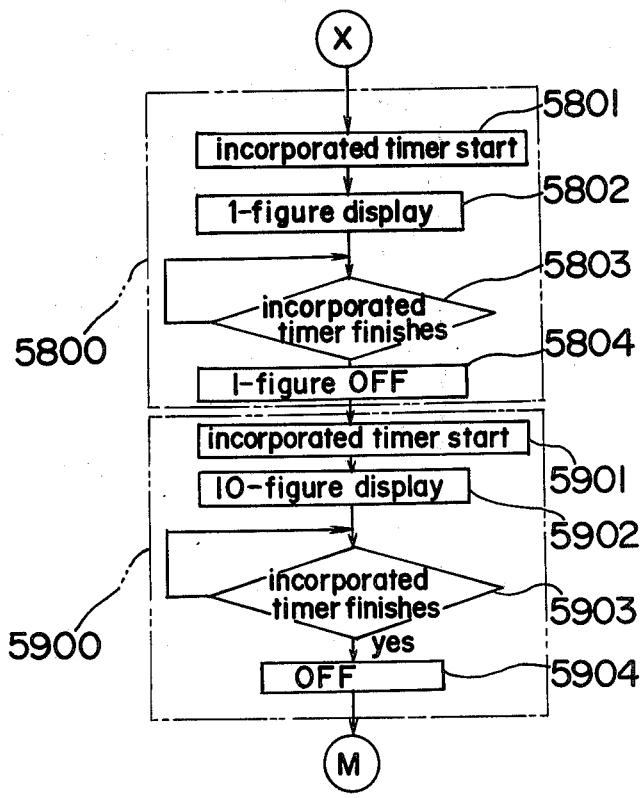
Figure 11B:
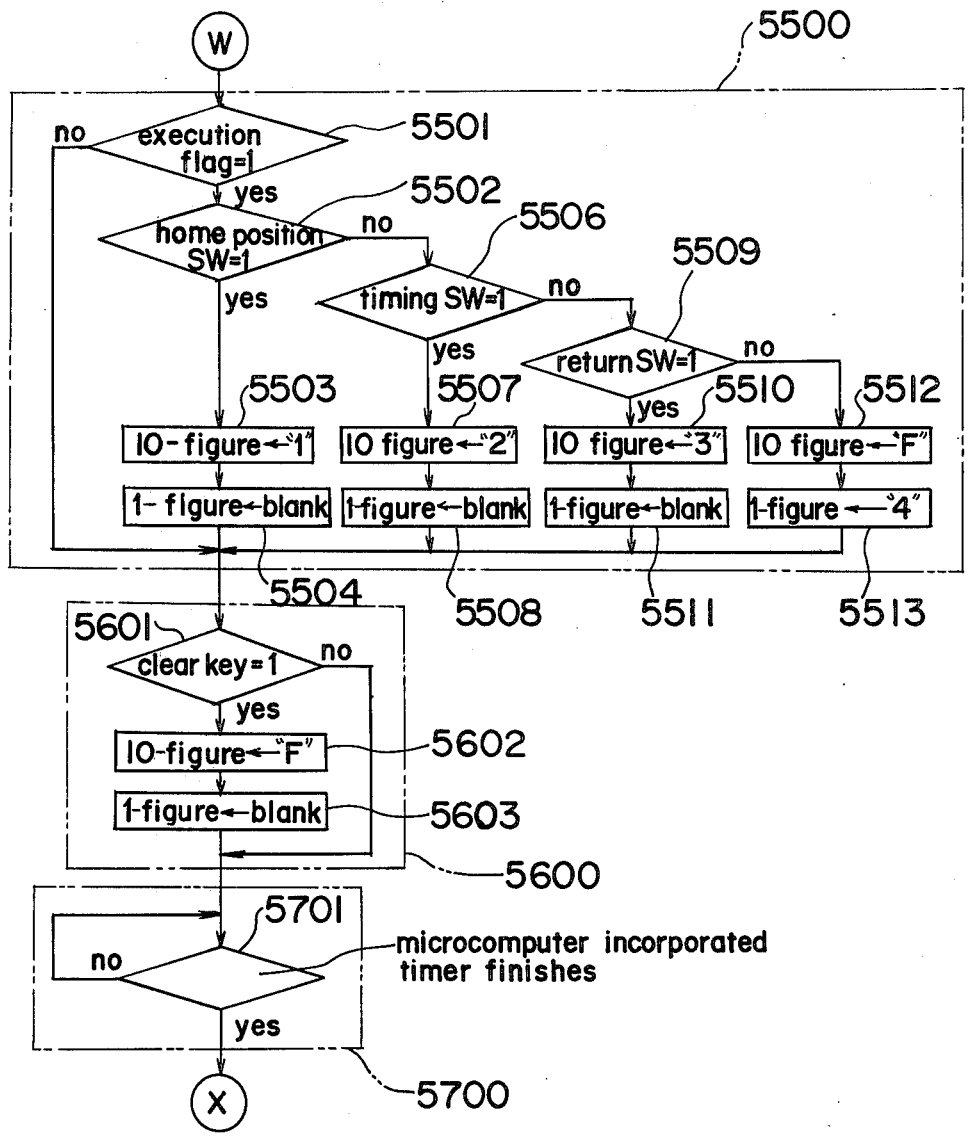
Figure 12:
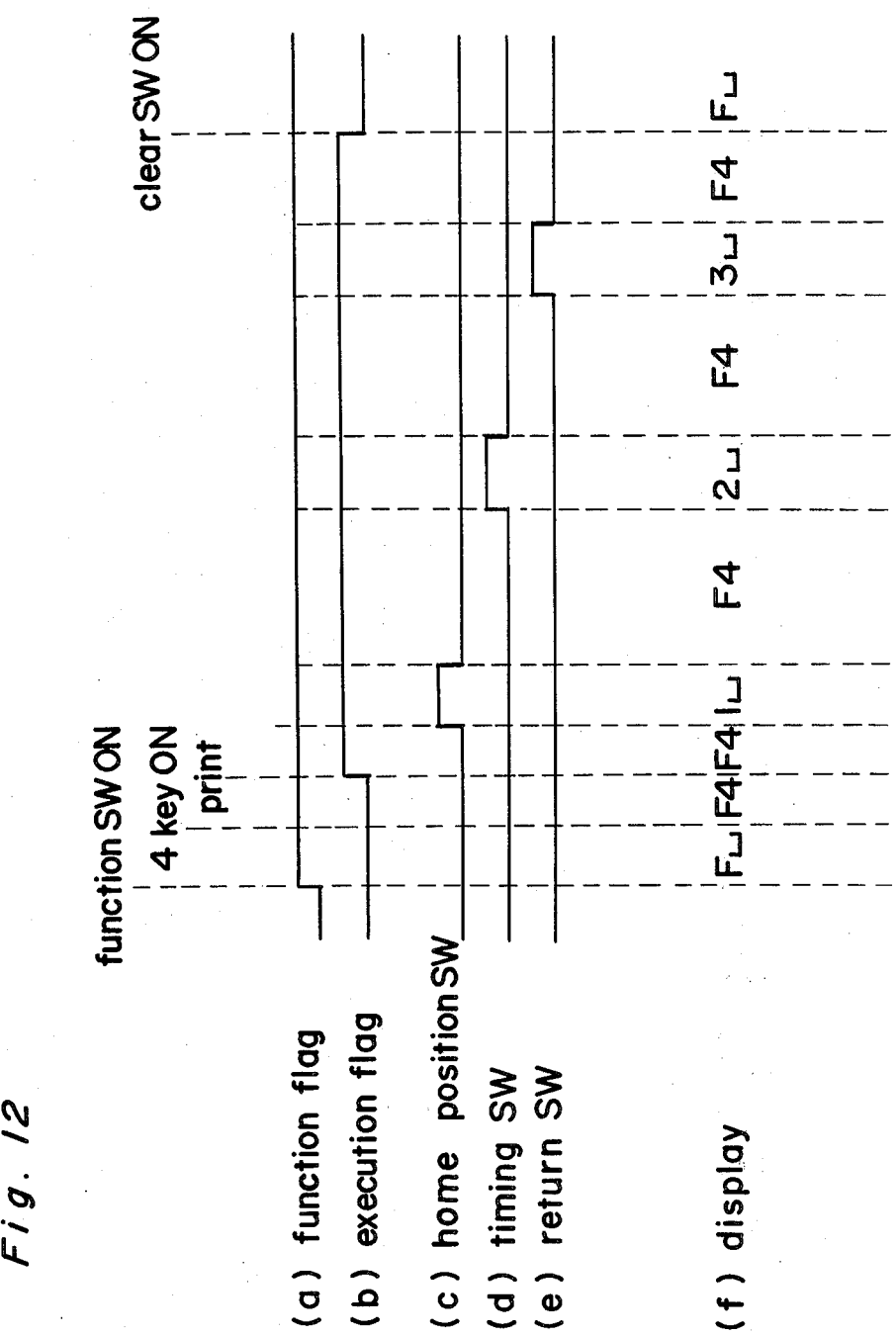
FIG. 12(a) through (f) are time charts each showing the relationship between each switch and the display of the display portion in the checking mode of the switch of the copying machine in a further embodiment of the present invention.

In a functional mode, the microcomputer MC executes each routine of the blocks 5100 through 5700 shown in FIG. 11(a) through (c).

(Processing at steps 5100 and 5200)

At the step 5101 of the block 5100 of the FIG. 11(a), the microcomputer MC starts the built-in timer for rendering the one routine length of the function operation uniform.

At the step 5201 of the block 5200, the microcomputer MC performs its scanning operation to detect whether or not any one of the register numeral keys is kept depressed and thereafter executes the processing operation of the block 5300.

(Processing in block 5300)

The block 5300 is a routine to judge whether or not the "4" key 334 of the register numeral key 33 has been depressed.

At the step 5301 of the block 5300, judgement is made whether or not the "4" key 334 of the register numeral key 33 is "1". If "1" is provided when the "4" key 334 is depressed, "4" is displayed (see FIG. 12(f)), on the one-figure seven-segment display element 38b of the display portion 38, at the step 5302, to execute the routine of the block 5400 or subsequent for checking the home position switch $SW_1$, the timing switch $SW_2$ and the return switch $SW_3$ which are described later.

When the judgement is made at the step 5301 that the "4" key 334 of the register numeral key 33 is not "1", the microcomputer MC jumps to the routine (not shown) of another function mode.

(Processing in block 5400)

In a block 5400, at the step 5401, the judgement is made as to whether or not the execution flag of the checking mode of the home position switch $SW_1$, the timing switch $SW_2$ and the return switch $SW_3$ is "0".

When the judgement is made that the execution flag is "0", the judgement is made whether or not the print switch 34 is "1" at a step 5402. When the print switch 34 is "1", the execution flag is set to "1" (see FIG. 12(b)) at a step 5403 to execute the routine of the next block 5500.

(Processing in block 5500)

A block 5500 is a routine for checking the home position switch $SW_1$, the timing switch $SW_2$ and the return switch $SW_3$.

At a step 5501, the judgement is made whether or not the execution flag of the routine of the block 5500 is "1".

When the home position switch $SW_1$ becomes "1" by the manual motion of the original carrier 11 of the copying machine 1 in a case where the execution flag is "1", the judgement is made that the home position switch $SW_1$ is "1" at a step 5502 to display "1", on the ten-figure seven-segment display element 38a of the display portion 38, at a step 5503, to render the one-figure seven-segment display element 38b of the display portion 38 blank at a step 5504 so that "1⊔" is displayed (see FIGS. 12(e), (f)) on the display portion 38.

When the timing switch $SW_2$ has become "1" due to the motion of the original carrier 11 as described hereinabove, the judgement is made that the timing switch $SW_2$ is "1" at a step 5506. The numeral "2" is displayed on the seven-segment display element 38a at a step 5507 and the seven-segment display element 38b is rendered blank at a step 5506 so that "2⊔" is displayed (see FIGS. 12(d), (f)) on the display portion 38.

Also, when the return switch $SW_3$ has become "1" by the motion of the manuscript stand 11, "3⊔" is displayed (FIGS. 12(e), (f)) on the display portion 38 by the processing of steps 5509 through 5511.

When either one of the home position switch $SW_1$, the timing switch $SW_2$ and the return switch $SW_3$ is 0, the "F4" is displayed (see FIG. 12(b), (e), (f)) on the display portion 38 due to the processing of the steps 5512 and 5513.

The inferiority of the home position switch $SW_1$, the timing switch $SW_2$ or the return switch $SW_3$ can be checked from the relationship of the display of the display portion 38 and the position of the original carrier 11, and each position of the switches $SW_1$, $SW_2$ and $SW_3$ can be adjusted.

If the "F4" is switched to the "1⊔", the "2⊔" or the "3⊔" in the display of the display portion 38 when the original carrier 11 has been moved in, each switch $SW_1$, $SW_2$ and $SW_3$ are respectively normal. When the display is not switched, the inferior condition such as short circuit, inferior contact or the like exists.

A proper mark is given, respectively, to the original carrier 11 and to the body portion of a copying machine 1 opposite to the original carrier. In a case where the switch $SW_1$, $SW_2$ and $SW_3$ are switched respectively when these marks have conformed to each other, the position of each switch $SW_1$, $SW_2$ and $SW_3$ is required to be adjusted so that the display of the display portion 38 may be switched, when the marks have conformed to each other, during the assembly or repair of the copying machine 1, or the like if only the operational timing of each switch $SW_1$, $SW_2$ and $SW_3$ is kept normal.

From the above description, the relationship between the display of the display portion 38 and the operational contents of the home position switch $SW_1$, the timing switch $SW_2$, the return switch $SW_3$, etc. can be summarized into the following Table 2.

TABLE 2

| Operational Contents | | Display |
| --- | --- | --- |
| function switch | on | FU |
| "4" key | on | F4 |
| print switch | on | F4 |
| normal position switch | on | 1U |
| normal position switch | off | F4 |
| timing switch | on | 2U |
| timing switch | off | F4 |
| return switch | on | 3U |
| return switch | off | F4 |
| clear switch | on | FU |

(However, ⊔ shows blank)

(Processing in block 5600)

At the step 5601 of a block 5600, the judgement is made as to whether or not the clear key (for example, a stop key 35 of the copying machine 1) is "1". When the clear key is "1", "F" is displayed on the ten-figure seven-segment display element 38a of the display portion 38 at the step 5602. After the one-figure seven-segment display element 38b has been rendered blank (see FIG. 10(b), (f)) at a step 5603, the end of the time period of the built-in timer of the microcomputer MC is waited for at the step 5701 of the following block 5700.

(Processing in block 5800 or subsequent)

The routine from the step 5801 of a block 5800 to the block 5804 is the same as that from the step 2201 to the step 2204 of the block 2200 of FIG. 7(d). Also, the routine from the step 5901 of the block 5900 to the step 5904 is the same as that of the step 2301 and the 2302 of the block 2300 of FIG. 7(d).

The completion of the step 5904 of the block 5900 finishes the execution of one routine of a function mode. When the built-in timer of the microcomputer MC starts, the processing routine of the above-described function mode is repeated.

The home position switch $SW_1$, the timing switch $SW_2$ and the return switch $SW_3$ can be checked and the mounting position can be adjusted by the display of the display portion 38 when the original carrier 11 has been manually removed.

In the two embodiments, a copying machine 1 of an original carrier moving type is shown as the embodiment of a mechanical apparatus. The present invention is not restricted to these embodiments. The present invention can be applied to any mechanical apparatus if a switch to be operated through the action of the mechanical apparatus and a controlling apparatus, which has a program to judge the operating condition to output a given controlling signal, is provided.

Since the copying machine shown in the above embodiment is normally provided with a display portion 38 for displaying the number of the copying sheet, the operating condition of the various switches can be displayed through the use of the display portion 38 in the execution of the checking mode of the switch. The display of the operating condition can be made even by the flashing of the lamp.

Also, to check each switch in the embodiment, the driving apparatus of the original carrier 11, clutch, etc. may be controlled so that only the original carrier 11 may be moved for test use during the checking operation of each switch.

The checking operation through the motion of the original carrier 11, which actually operates these switches, with respect to each switch has an advantage in that even the operational timing of each switch can be checked as described above in the embodiment. However, the original carrier 11 is not required to be moved only to check the switch.

As apparent from the detailed description, in a mechanical apparatus provided with a switch to be operated through the action of the mechanical apparatus and a controlling apparatus having a program, which judges the operating condition of the switch to output a given controlling signal, a controlling mode for checking the controlling apparatus switch and a program for displaying the changing-over condition of the switch when the switch has been operated at the controlling mode are provided so that the switch may be checked through the mode switching operation of the controlling apparatus. The present invention is extremely superior in practical value, since the judgement can be easily made as to the operational condition of the switch through the simple operation such as mode switching operation or the like during the assembling operation, repairing inspecting operations or the like of the mechanical apparatus.

Also, by application of the present invention to the display apparatus for setting the number of copying sheet like the copying machine, the display apparatus can be used to display the operating condition of the switch. A special apparatus is not required to be provided to display the operating condition of the switch.

To check each switch, a member for operating the switch can be moved not only to perform the checking operation including the condition of the operating member, but also to check the operating timing of each switch through the motion of the movable member.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. In an electrostatic copying apparatus provided with a switch to be operated through an operation of a movable member of the copying apparatus and provided with a controlling apparatus which has a program for judging the operating condition of said switch so as to output given controlling signals, a switch checking system wherein said controlling apparatus has a controlling mode for switch checking use and a program for displaying the changing-over condition of said switch when said switch has been operated in said controlling mode, whereby the switch is adapted to be checked through the mode changing-over operation operation of said controlling apparatus.

2. A copying apparatus in accordance with claim 1, wherein the movable member of said copying apparatus is adapted to be manually moved when said controlling apparatus has been switched to said switch checking mode and the movable member is manually moved to check the switches.

3. A copying apparatus in accordance with claim 1 or claim 2, wherein the switch checking mode is individually set with respect to each switch when a plurality of switches exist and wherein one switch is adapted to be checked in one mode.

4. A copying apparatus in accordance with claim 1 or claim 2, wherein a plurality of switches are checked in one checking mode, when a plurality of switches exist, so as to provide different displays with respect to each of the switches.

5. A copying apparatus in accordance with claim 1 or claim 2, wherein said movable member is for scanning an original, and wherein said switches are positioned so as to be operated through the movement of said movable member for a scanning operation and a switch checking display is provided by a display means for presetting the continuous operational frequency of said copying apparatus.

6. In an electrostatic copying apparatus provided with a switch to be operated through an operation of a movable member of the copying apparatus and provided with a controlling apparatus which has a program for judging the operating condition of said switch so as to output given controlling signals, a switch checking system wherein said controlling apparatus has a controlling mode for switch checking use and a program for displaying the changing-over condition of said switch when said switch has been operated in said controlling mode and a mode change-over operating means which emits a signal for setting said controlling apparatus to said controlling mode by an external operation, whereby the switch is adapted to be checked through the mode changing-over operation of said controlling apparatus.

* * * * *